United States Patent Office 3,136,143
Patented June 9, 1964

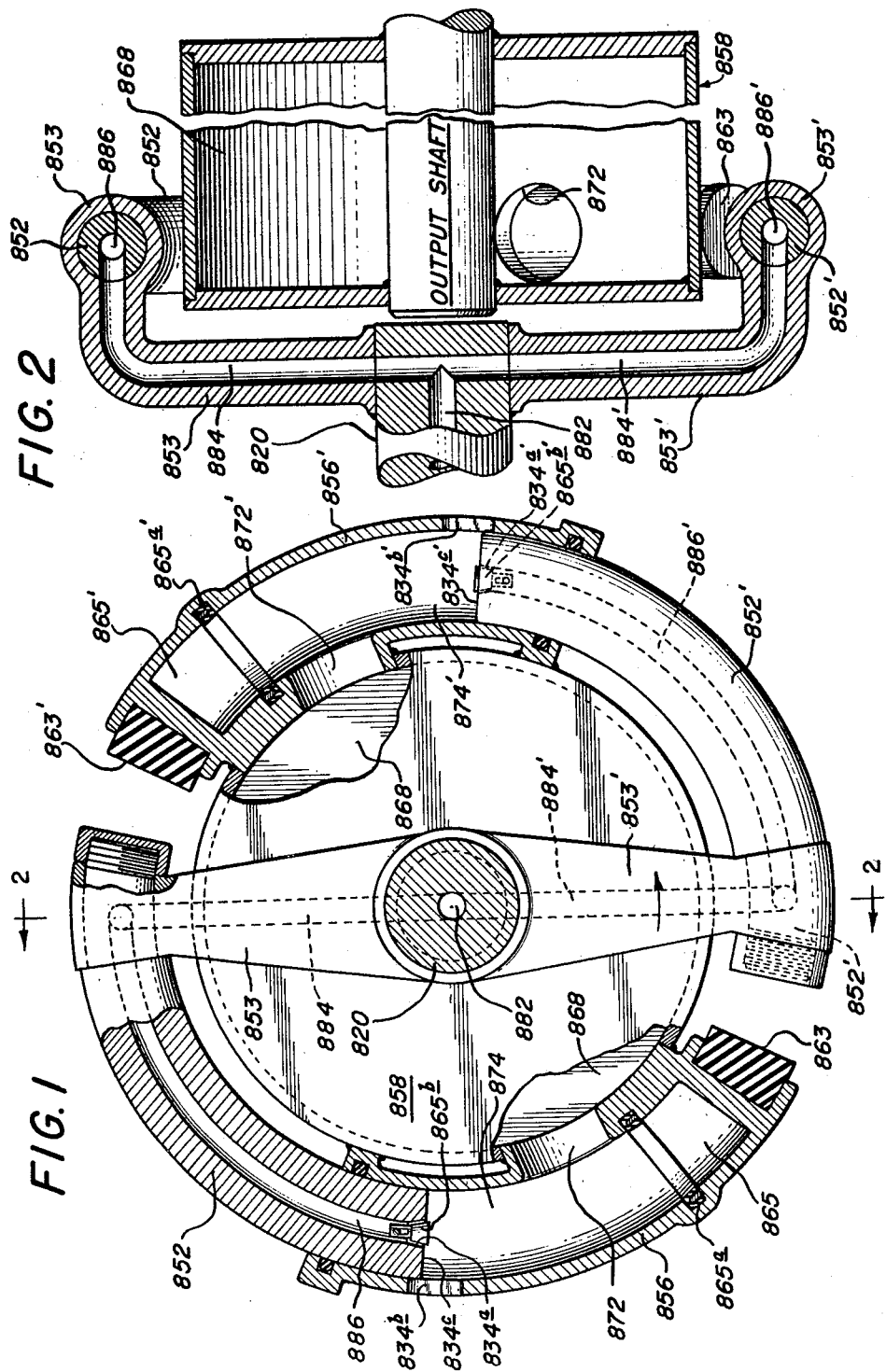

3,136,143
PNEUMATIC TORQUE-TRANSMITTING COUPLING FOR ISOLATING ANGULAR VIBRATION
Charles Leavell, 206 S. Fairfield Ave., Lombard, Ill.
Filed Apr. 9, 1962, Ser. No. 186,039
18 Claims. (Cl. 64—26)

This invention is concerned with the elimination of angular vibration of a body about its center of gravity and has utility, for example, in environments in which torque is transmitted from one body or element to another. The transmission of torque from an engine to a drive shaft may be taken as a specific example of such environment.

My copending patent application, Serial No. 742,878, filed June 18, 1958, now Patent No. 3,028,841, discloses a vibration-isolating, force-transmitting linkage of general utility in the exemplary environment of a percussive tool structure, and explains that the greater part of anti-vibration research pertains to the tripartite mechanical combination of (1) a desirably or unavoidably vibrating body, (2) a second body in which the occurrence of vibration is objectionable, and (3) connecting structure accomplishing a necessary transmission of force between the two bodies. Such patent also explains that the problem of greatest concern in such tripartite vibratile mechanical combinations is that of maintaining the necessary transmission of force between such two bodies, and at the same time minimizing the communication of vibration therethrough from the desirably or unavoidably vibrating body to the second body in which the occurrence of vibration is undesirable.

Additionally, such Patent No. 3,028,841 introduces a system for classifying vibrations in terms of the degrees of complexity of the paths traced in space by their vibratory motions; and specifically, the distinctions relative to path-complexity defined as in analytic geometry, in terms of the fewest-dimensioned spaces capable of containing such paths, are used for such classification. Accordingly, vibration is classified with reference to a path traced by it as being either (A) a 1-dimensional or linear vibration, or (B) a 2-dimensional or planar vibration, or (C) a 3-dimensional or solid vibration, depending on whether (a) such path can exist within a straight line, or (b) not being capable of such confinement within a straight line, can exist within a plane, or (c) not being capable of such confinement within a plane, can exist within a solid space (i.e., a volume).

As noted in the aforementioned patent, if the element exhibiting the vibration to be categorized in accordance with this classification scheme is a ponderable body of greater dimensions than a geometric point, the question arises as to just what point either upon its surface or within its mass is to be taken as tracing the path with respect to which the vibratory motion of the element will be classified as being either 1-, 2-, or 3-dimensional (or linear, planar, or solid), and it may be stated in general that the center of gravity of such a body can be used conveniently as the determining point. In other words, the vibratory motion of the body will generally be classified in accordance with the nature of the path traced by its center of gravity.

However, since any such ponderable body may (or may not) exhibit an angular vibration about its center of gravity simultaneously with the description of a path by the center of gravity, and also when its center of gravity is stationary, the classification system was expanded in such prior application to include the following seven cases:

I (a) Vibratory motion of a body comprising a linear vibration of its center of gravity associated with a condition of no angular vibration of the body.
(b) Vibratory motion of a body comprising a linear vibration of its center of gravity associated with an angular vibration about its center of gravity.

II (a) Vibratory motion of a body comprising a planar vibration of its center of gravity associated with a condition of no angular vibration of the body.
(b) Vibratory motion of a body comprising a planar vibration of its center of gravity associated with an angular vibration about its center of gravity.

III (a) Vibratory motion of a body comprising a solid vibration of its center of gravity associated with a condition of no angular vibration of the body.
(b) Vibratory motion of a body comprising a solid vibration of its center of gravity associated with an angular vibration about its center of gravity.

IV

Vibratory motion of a body comprising an angular vibration about its center of gravity associated with a stationary condition of its center of gravity.

As stated heretofore, such Patent No. 3,028,841 discloses a vibration-isolating, force-transmitting linkage of general utility useful in connection with the elimination of 1-, 2-, and 3-dimensional vibrations, and specifically exemplifies such linkage in application to the elimination of 1-dimensional or linear vibratory motions coming within division I(a) of the foregoing classification system. In distinction thereto, the present invention is concerned with and has for its objects, among others, the provision of a system including a torque-transmitting linkage composition defining the aforesaid connecting structure (3) accomplishing a necessary transmission of torque between an angularly vibrating body (1) and a second body (2) in which the occurrence of vibration is objectionable without transmitting angular vibration thereto; and this invention, then, is concerned with the angular vibratory motions coming within division IV of the foregoing classification system. As the specification develops, additional objects and advantages of the invention will become apparent.

An exemplary embodiment of the invention is illustrated in the accompanying drawing, in which—

FIGURE 1 is a transverse sectional view, with certain of the components being shown wholly or partly in elevation, of a torque-transmitting system embodying the invention; and FIGURE 2 is a longitudinal sectional view taken along the plane 2—2 of FIGURE 1.

The invention embodied in the structural composition illustrated in the drawing is applicable to a wide variety of environments as where it is necessary to transmit torque from a first body or element to a second body or element, and in which the torque present in such first body is non-uniform—that is, variable in value, such application thereof having the utility that undesirable angular vibration (a variable or reversing torque term in this instance) which ordinarily would be transmitted from such first to the second body or element is not transmitted therebetween.

A well known instance of the undesirable transmission of angular vibration from one element to another is in the transmission of torque from the crank shaft of an internal combustion engine to an output shaft which, for example, may be the drive shaft of an automobile. The torque delivered by such engine is continuously variable in value and, in fact, an important purpose in providing multiple-cylinder engines is to reduce the magnitude of the variations in the torque delivered by the engine crank shaft, which is accomplished at the expense of increasing the frequency of the torque variation, as well as increasing the cost and complexity of the engine. More particularly, as the number of cylinder-piston compositions in an engine is increased, the power delivered by each piston is decreased because of the reduced displacement thereof and a correspondingly more rapid succession of relatively small power impulses is imparted to the crank shaft by the respective pistons on the power strokes thereof in contradistinction, for example, to a one-cylinder engine wherein necessarily large power impulses are imparted to the crank shaft at relatively low frequency. The multiple-cylinder engine, then, is a system for smoothing out or reducing, but not eliminating, the magnitude of the torque variation or angular vibration transmitted from the crank shaft thereof to an output or drive shaft.

The structure illustrated in the drawing includes an input shaft 820 adapted to be rotated by a prime mover or power plant (not shown), such as an internal combustion engine, which imparts angular vibration in the form of torque variations thereto. Rigidly secured, as by welding, to the input shaft 820 are a pair of diametrally extending arms or drivers 853 and 853'. Respectively carried by the arms are a pair of arcuate pistons 852 and 852' that are reciprocable in respectively associated arcuate cylinders 874 and 874' defined within casing elements 856 and 856'. The arms 853 and 853' are equipped at the outer ends thereof with collars that are respectively circumjacent reduced end portions of the pistons 852 and 852' and are constrained thereon by caps which are threadedly received upon the ends of the pistons and bear against the collars. Therefore, as shown best in FIGURE 1, the caps force the respective collars against shoulders defined by the mergence of the areas of reduced diameter of the pistons with the areas of larger diameter thereof.

The cylinders are open at one end to pass the respectively associated pistons thereinto, and are closed at their opposite end portions (which are respectively designated with the numerals 865 and 865') by transversely disposed walls or end closures. Spaced slightly from each such end closure along the longitudinal axes of the cylinders are annular channels that respectively receive annular seals 865a and 865a' therein. These seals may be conventional U-cups or U-seals and are oriented with the open sides thereof facing the end closures of the respectively associated cylinders, and such seals serve to prevent the escape of fluid therepast as the pistons move into engagement therewith and toward abutment with the end closures of the cylinders. Thus, the seals, in cooperation with the respectively associated pistons and closed end portions of the cylinders, establish an air cushion that positively prevents impact of the pistons with the transverse end closures of the cylinders, as described in somewhat greater detail hereinafter.

The cylinder casings 856 and 856' are rigidly connected to a relatively large cylindrical casing 858 that defines a large chamber 868 therewithin. An output shaft, so designated in the drawing, extends through the chamber 868 and is welded or otherwise rigidly secured to the casing 858, and the axis of rotation of the output shaft is substantially coaxial with that of the input shaft 820. The chamber 868 is in open communication with the respective cylinders through openings 872 and 872'—the cross sectional areas of which are sufficiently large so that no appreciable gradients occur in the pressure of the fluid flowing therethrough.

A gaseous fluid such as compressed air is supplied to the chamber 868 through the cylinders 874 and 874' from longitudinal passages 886 and 886' extending along the axes of the respective pistons 852 and 852'. Such piston passages respectively connect with flow passages 884 and 884' provided by the arms 853 and 853' (as shown most clearly in FIGURE 2); and such passages in the arms communicate with a flow passage 882 provided along the longitudinal axis of the input shaft 820. The passage 882 is adapted to be connected to a source of pressure fluid (not shown) which may be a conventional air compressor.

The piston passages 886 and 886' are respectively equipped with valve seats 834a and 834a' at the outlet ends thereof, which are adapted to respectively cooperate with check valves 865b and 865b' carried by the respective pistons for selective closing engagement with such valve seats. Each of the respectively associated check valves and valve seats defines a restricted inlet orifice through which pressure fluid flows into the cylinders 874 and 874' and into the chamber 868. Each of the cylinders is provided with an exhaust outlet, respectively designated with the numerals 834b and 834b', which are elongated along the axes of the cylinders and are adapted to be traversed by the pistons 852 and 852' and the end walls or surfaces 834c and 834c' thereof.

The caps threadedly received upon the outer end portions of the pistons are adapted to abut resilient pads 863 and 863' respectively carried by the casing elements 856 and 856' at the ends thereof adjacent such caps. The pads prevent metal-to-metal impact between the piston 852 and casing element 856', and between the piston 852' and casing element 856, in the event that the pistons are displaced in a clockwise direction (as viewed in FIGURE 1) relative to the casing elements to an extent which would otherwise cause such metal-to-metal impact.

The locations of the connection of the arms 853 and 853' with the respective pistons 852 and 852' are angularly separated by approximately 180°, and the two pistons extend from the arms in the same angular direction (that is, in a counterclockwise direction as viewed in FIGURE 1). For this reason, the pistons are serially oriented in terms of structure, but function in parallel in their transmission of torque from the input shaft 820 to the output shaft. In connection with the accomplishment of such function, the cylinder 874, large opening 872 and chamber 868 define a constant pressure space, as do the cylinder 874', large opening 872' and chamber 868. A gases column is present in each of the cylinders, and the pressure force developed within each such column acts between the end wall 834c and end closure of the cylinder 874 in the case of the piston 852, and between the end wall 834c' and end closure of the cylinder 874' in the case of the piston 852'.

With one exception, which will be described hereinafter, pressure fluid is continuously supplied to the constant pressure spaces through the respective passages 886 and 886' and restricted inlet orifices associated therewith, and fluid continuously escapes from the constant pressure spaces through the exhaust outlets 834b and 834b' whenever such outlets are at least partially uncovered by the respectively associated pistons 852 and 852'. It will be apparent that pressure fluid is continuously supplied to the passages 886 and 886' since they are always in open communication with the supply passage 882 through the respectively associated passages 884 and 884' in the arms 853 and 853'.

In considering the operation of the structure, it may be noted that the various components have the relative positions illustrated in the drawing whenever the input shaft 820 is either stationary or is being rotated with a torque of uniform value, and with pressure fluid being supplied to the passage 882 in the input shaft. Assuming a condition in which the input shaft 820 is rotating, the direction of rotation thereof will be in a counterclockwise direction, as viewed in FIGURE 1; and torque will be transmitted from the input shaft 820, through the arms 853 and 853' which are rigidly related thereto, and to the pistons 852 and 852' which will effect rotary motion thereof about the axis of rotation of the input shaft.

A corresponding rotary motion will be enforced on the cylinder casings 856 and 856' because torque will be transmitted thereto through the pressure forces resepectively operative between the piston surface 834c and transverse end closure of the cylinder 874 and between the piston surface 834c' and transverse end closure of the cylinder 874'. Consequently, both the pistons 852 and 852' and the respectively corresponding cylinder casings 856 and 856' will describe a rotary path about the rotational axis of the input shaft 820; and quite apparently, the casing 858 and output shaft will rotate because of their rigid mechanical connection with the cylinder elements (the output shaft being connected thereto through the casing 858).

Angular vibrations and torque variations experienced by the pistons 852 and 852' are not transmitted therefrom by the cylinder casings 856 and 856' (and to the output shaft connected thereto) because the value of the torque transmitted by such fluid columns operative between the pistons and cylinder casings remains substantially constant during vibratory displacements of the pistons relative to the casing elements and cylinders 874 and 874' defined therein. The reason for this is that the total volume of each of the constant pressure spaces respectively comprising the cylinder 874-chamber 868 composition and cylinder 874'-chamber 868 composition is sufficiently large relative to the changes therein that necessarily accompany vibratory displacements of the pistons 852 and 852' within their respectively corresponding cylinders that substantially no change in pressure occurs in such constant pressure spaces as a consequence of such displacements; and, therefore, substantially no change occurs in the value of the torque components transmitted between the respective pistons and cylinder casings.

Further to this point, there is no tendency for the pistons to be displaced relative to the cylinders in which they are reciprocable so long as the pistons are being driven by a uniform torque. However, if they are being driven by a non-uniform torque that either cyclically or periodically increases and decreases in value, as where the input shaft 820 is being driven by an internal combustion engine, the pistons become necessarily or unavoidably vibrating bodies or elements because such variable torque is enforced thereon; and when the value of the torque momentarily increases, the pistons are accelerated relative to their cylinders and are displaced thereinto toward the transverse end closures thereof. Conversely, when the value of the driving torque momentarily decreases, the pistons are decelerated relative to their cylinders and tend to be displaced outwardly therefrom. As stated, however, such vibratory displacements of the pistons about a mean position relative to the cylinders in which they are reciprocable do not result in the transmission of angular vibration to the cylinder casings because the torque transmitted by the arcuate gaseous columns operative between the pistons and cylinders remains substantially constant during any such vibratory displacement.

The combination of each of the constant pressure spaces including the fluid column defined therein together with the restricted inlet orifice supplying fluid thereto, exhaust outlet, and the associated piston including the inner end surface thereof (834c or 834c') defines a torque-transmitting linkage that is not only operative to transmit torque between the pistons and cylinders without transmitting angular vibration therebetween, as heretofore described, but which is also operative to enforce a torque-invariable positional stability upon the pistons and cylinders.

More particularly, and assuming a condition in which the torque driving the pistons 852 and 852' is suddenly increased, the pistons will necessarily be angularly accelerated and displaced inwardly into their associated cylinders; and as a result, the exhaust outlets will be either completely closed or closed to a greater extent than illustrated in FIGURE 1. Consequently, and since pressure fluid is being continuously supplied to the cylinders through the restricted inlet orifices communicating therewith, the pressure within the constant pressure spaces will necessarily increase in value and will continue to so increase until the values are sufficiently great to return the pistons to their prior mean position locations with respect to the cylinders and exhaust outlets thereof.

Conversely, a decrease in the magnitude of the applied torque will decelerate the pistons angularly and cause the same to be displaced outwardly relative to their respective cylinders, whereupon the effective escape areas of the exhaust outlets will be increased. Consequently, the increased flow of pressure fluid out of the constant pressure spaces will decrease the value of the torque being transmitted between the pistons and end closures of the respective cylinders until the pistons are returned to their prior mean positions relative to the cylinders and cylinder casings. Therefore, it may be said that the linkage effectively imposes a torque-invariable positional stability on the piston and cylinder structures and in so doing, automatically adjusts the value of the transmitted torque to compensate for changes in the magnitude of the torque applied to the input shaft.

In certain exceptional or abnormal instances, the torque driving the pistons 852 and 852' may be suddenly increased in value to a magnitude such that the pistons will tend to be displaced inwardly into impact engagement with the respective end closures of the cylinders. Quite apparently, direct impact between the pistons and cylinder end closures would be undesirable, and is prevented in the present structure because of the positive air cushions defined at such time by the compressible pressure fluid in the end portions 865 and 865' of the cylinders. More particularly, once the pistons have moved into substantial engagement with the seals 865a and 865a', the pressure fluid in the end portions of the cylinders cannot escape therefrom, and as the pistons approach the cylinder end closures the pressure in such air cushions progressively increases in value toward infinity so that the pistons are constrained by such air cushions against direct impact engagement wtih the end closures of the cylinders. The pressure force developed in such cushions between the pistons and cylinder end closures in any such abnormal instance will impart a vibratory motion or displacement to the cylinder casings and to the output shaft, but will be less objectionable than that which would be caused by direct metal-to-metal impact.

It should be noted that at the occurrence of such unusual displacement of the pistons, the valves 865b and 865b' are simultaneously closed and pressure fluid cannot be forced outwardly therepast from the air cushions. In this connection, the outer surface of each valve has a greater area than the inner surface thereof so that the valves will be actuated toward closed position by the pressures within such cushions somewhat before the pressures therein equal the pressure of the opposing fluid within the passages 886 and 886' attempting to maintain the valves in their open position. Except for this abnormal condition, the supply pressure within the passages 886 and 886' does maintain the valves in their open position, and normally has a value that substantially exceeds the pressure values within the constant pressure spaces because the restricted inlet orifices, defined in part by such valves, cause a drop in pressure in the fluid flowing therethrough into the constant pressure spaces being continuously or recurrently relieved of pressure development therein toward or to the supply pressure by the escape of the fluid from the exhaust outlets.

If the torque driving the pistons 852 and 852' is suddenly decreased in value by a sufficient amount, the pistons will tend to be completely withdrawn from their respective cylinders; and in such event, the caps threaded onto the outer ends of the pistons will abut the resilient cushions or pads 863 and 863' carried by the casing elements. If the inertia of the cylinder casings, casing 858, output shaft and apparatus being driven thereby is sufficiently great to maintain such engagement between the end portions of the cylinder casings and the pistons, the pistons, arms 353 and 853′, input shaft 820 and apparatus connected therewith will operate to quickly reduce the angular velocity of the output shaft, etc.; which facilitates the return of the pistons to their prior location with respect to the cylinders in certain instances, and will terminate rotation of the output shaft when the operation of the prime mover driving the input shaft 820 has been terminated.

It should be appreciated that a condition may exist in which the load on the output shaft is changed, and the structure is also operative to accommodate and compensate for such changes. For example, if the load on the output shaft is suddenly increased, the cylinders and casings 856 and 856′ thereof will tend to decelerate and the pistons 852 and 852′ will be displaced inwardly toward the end closures of the cylinders. This condition, then, is effectively the same as the prior described condition in which the driving torque applied to the pistons is increased, and the corrective action of the linkage occurs in the same manner. Similarly, if the load on the output shaft is suddenly decreased, the cylinders and casings 856 and 856′ thereof will tend to accelerate and the pistons will be displaced outwardly from their cylinders. This condition, then, is effectively the same as the prior described condition in which the driving torque applied to the pistons is decreased, and the corrective action of the linkage occurs in the same manner.

The foregoing description makes it evident that the pistons 852 and 852′ move simultaneously in mechanically enforced synchronism and function in parallel. In this connection, the piston 852 and casing element 856 provide relatively reciprocable opposed surfaces (namely, the surface 834c provided by the piston and the end closure of the cylinder 865) between which the torque-transmitting linkage is operative which is defined by the fluid column within the cylinder 874; and, similarly, the piston 852′ and casing element 856′ provide relatively reciprocable opposed surfaces (namely, the surface 834c′ provided by the piston and the end closure of the cylinder 865′) between which the torque-transmitting linkage is operative which is defined by the fluid column within the cylinder 874′. It may be noted that the pressure within the cylinder 874 and that within the cylinder 874′ are normally of substantially equal value since both cylinders are connected to the same large chamber 868.

The positional stability referred to hereinbefore is that in which the pistons and their respectively associated cylinder elements normally have a condition of impact-preventing separation therebetween in which the pistons are maintained intermediate the extreme limits of the range of reciprocatory movement thereof. The maintenance of such condition of intermediacy prevents the cylinder elements from being excited into vibratory motions by impact forces which would be delivered thereto by abutment of the pistons either with the resilient cushions 863 and 863′ or with the air cushions established within the cylinder end portions 865 and 865′.

The exhaust outlets 834b and 834b′ are elongated along the axis of reciprocation of the pistons, and this arrangement attenuates the corrective response of the linkage to changes in the applied torque or to changes in the output load, and thereby prevents a hunting action which might otherwise occur if the exhaust openings were not so elongated and could cause a slight undulation in the rotary motion of the casing elements and rotational motion of the output shaft. In this respect, the corrective action of the linkage is in the nature of a continuous function in contrast to a step function in the case of an exhaust opening not so elongated. (Reference may be made to my copending patent application, Serial No. 186,198, filed April 9, 1962, for a more detailed explanation of this distinction.)

Therefore, it is apparent that the apparatus includes a vibration-isolating, torque-transmitting linkage operative to transmit a substantially constant torque between a body that is necessarily or unavoidably subject to variable torque or angular vibration and a body in which the occurrence of angular vibration is undesirable so that substantially no angular vibration is transmitted therebetween; and which is also operative by virtue of its restricted-inlet-variable-outlet pneumatic feedback control to automatically and regulatively vary the value of such transmitted torque in accordance with and to compensate for changes in the magnitude of the loading torque (applied or input torque, or output load) to compensate therefor and provide a torque-invariable mean positional stability on the two bodies.

While in the foregoing specification an embodiment of the invention has been set forth in considerable detail for purposes of making an adequate disclosure thereof, it will be apparent to those skilled in the art that numerous changes may be made in such details without departing from the spirit and principles of the invention.

I claim:

1. In combination with apparatus having an angularly vibratory element and an element in which the occurrence of angular vibration is undesirable, pneumatic connecting linkage for effectuating a necessary transmission of torque therebetween, pneumatic feedback control means for automatically adjusting the value of such transmitted torque in response to changes in the mean relative position of said vibratory and second mentioned elements to maintain a predetermined relation therebetween, and means for maintaining any such adjusted value relatively constant throughout any cycle of the vibratory angular motion of said vibratory element to obviate superimposition of angular vibration upon the torque transmitted between said elements.

2. The combination of claim 1 in which said elements define relatively reciprocable opposed portions between which said transmitted torque is operative, and in which said predetermined relation is one of normally continuous separation between said elements in the direction of such relative reciprocation whereby the transmission of angular vibration to said second element by repetitive stop-and-rebound action between said vibratory and second elements is prevented.

3. The combination of claim 1 in which said means for automatically adjusting the value of such transmitted torque comprises means for automatically varying the pressure in said pneumatic connecting linkage.

4. In structure of the character described, the combination of a pair of relatively reciprocable elements consisting of a first rotary element capable of displaying both short-interval vibratory reciprocations and reciprocations caused by longer-interval changes in the magnitude of the applied torque effecting rotary movement thereof, and a second rotary element in which the occurrence of angular vibration is objectionable, said elements providing relatively reciprocable opposed surfaces and being required to have a substantially continuous condition of impact-preventing separation therebetween during proper operation of the structure, means defining a pressurizable enclosure and means for establishing therewithin a gaseous column extending between said opposed surfaces and transmitting a torque between said elements, the volume of said enclosure being so related to the increases and decreases in the volume of said column produced by such vibratory reciprocations of said vibratory element that substantially no change in pressure occurs within said enclosure because of such vibratory reciprocations, and means for automatically adjusting the value of the pressure within said enclosure in relation to the reciprocations of said vibratory element caused by changes in the magnitude of such applied torque effecting rotary movement thereof so as to maintain the aforesaid required condition of separation between said elements.

5. The structure of claim 4 in which said means for automatically adjusting the value of the pressure within said enclosure comprises means for supplying gas under presure to said enclosure, means for permitting the escape of gas from said enclosure, and means for regulating the relative rates of such escape and supply of gas so as to selectively increase or decrease the pressure therein to maintain the said condition of separation between said elements.

6. The structure of claim 4 in which said pressurizable enclosure is provided with an inlet adapted to communicate with a source of gas under pressure and with an exhaust outlet, and in which said automatic adjusting means includes a seal member carried by said vibratory element to traverse said outlet and maintain a selectively variable control over the rate of exhaust flow therethrough.

7. The structure of claim 4 in which said second rotary element comprises a pair of arcuate cylinders and said first rotary element comprises a pair of arcuate pistons respectively reciprocable therein, each of said piston and cylinder combinations providing relatively reciprocable opposed surfaces as aforesaid, and in which each of said cylinders is defined in association with a pressurizable enclosure and such a gaseous column is established therein between the respectively associated pairs of opposed surfaces.

8. The structure of claim 7 and further comprising an input shaft rigidly related to said pistons, and an output shaft rigidly related to said cylinders.

9. The structure of claim 8 in which cushioning means are provided to attenuate any impacts between said pistons and cylinders, said cushioning means defining the extreme limits of the range of relative reciprocation afforded between said pistons and cylinders.

10. The structure of claim 9 in which said means for automatically adjusting the aforesaid pressure value comprises inlet means for supplying gas under pressure to said enclosure, outlet means for permitting the escape of gas from said enclosure and means for regulating the relative rates of such escape and supply of gas to selectively increase or decrease the pressure therein to maintain the aforesaid condition of separation between said elements.

11. The structure of claim 10 in which said inlet means includes flow passage means provided by each of said pistons and a pair of valve structures respectively associated therewith to prevent the flow of gas from said cylinders and through such flow passage means when said pistons approach the extreme limit in one direction of their range of reciprocation relative to said cylinders.

12. In combination with apparatus having a first element angularly vibratory about a predetermined axis and a second element in which the occurrence of angular vibration about such axis is objectionable, said elements providing relatively reicprocable opposed surfaces and being capable of displaying relative angular reciprocations about such axis caused by comparatively long-interval changes in the magnitude of a loading torque developed upon at least one of said elements, said first element being capable of displaying relative angular vibrations about such axis caused by comparatively short-interval changes in the magnitude of a loading torque developed thereupon, pneumatic connecting linkage operative between said opposed surfaces for effectuating a transmission of torque between said elements about an axis substantially coincident with the aforesaid axis, means for restricting the value of such transmitted torque to a relatively constant value throughout any cycle of the vibratory motion of said first element, and means for automatically altering such constant value during a sequence of such cycles to compensate for such long-interval changes in loading torque magnitude and maintain a predetermined mean relative angular positional relation upon said elements.

13. The combination of claim 12 in which one of said elements comprises an arcuate cylinder and the other an arcuate piston reciprocable therein, the arcuate longitudinal axes of said cylinder and piston being substantially coincident and described about the aforesaid substantially coincident axes, the aforesaid relatively reciprocable opposed surfaces being respectively provided by said cylinder and piston in transverse orientation with respect to said arcuate longitudinal axes thereof.

14. An apparatus having a pair of related elements in one of which the occurrence of angular vibration about a predetermined axis is objectionable and the other of which is adapted to experience 1-dimensional angular vibrations along an arcuate axis described about such predetermined axis, said elements presenting facing relatively arcuately vibratory pressurizable surfaces extending transversely of said arcuate axis, pneumatic linkage means interposed between said surfaces for transmitting torque therebetween, and composite means for preventing the transference with such torque of angular vibration about such predetermined axis to the element wherein it is objectionable comprising means for restricting the value of the torque communicable through said linkage to a substantially constant value, and means for maintaining a substantially continuous positional relation between such transversely extending surfaces obviating impact action therebetween, such latter means including means for regulatively altering such substantially constant value automatically as necessary to compensate for operational changes tending to interrupt such continuous positional relation.

15. The apparatus of claim 14 in which said torque-transmitting linkage comprises a variable-length arcuate gaseous column, and in which said regulating means comprises feedback means controlled by and controlling changes in the positional relation of said elements to produce restorative length-variations in said column so as to maintain said surfaces in such positional relation.

16. In combination with a pair of elements relatively displaceable in an angular sense, one being an element in which the occurrence of angular vibration is unavoidable and the other an element in which the occurrence thereof is undesirable, coupling mechanism interconnecting said elements for the transmission of necessary torque therebetween and comprising: structure defining a cylinder and connected with one of said elements so as to be angularly displaceable therewith, piston structure within and reciprocable relative to said cylinder and connected with the other of said elements so as to be angularly displaceable therewith, means for establishing and pressure-regulating a variable-length gaseous column extending within said cylinder and between a pair of relatively reciprocable facing surfaces respectively provided by said piston and cylinder structures and transmitting torque therebetween, a casing defining a pressurizable chamber and port means establishing continuously uninhibited pressure communication between said cylinder and chamber, the total volume defined by said chamber and by the cylinder space in such communication therewith being so related to the increases and decreases in the volume of said column produced by relative angular displacements of one of said elements with respect to the other that substantially no change in pressure occurs within such total volume as a consequence of such relative displacements, said means for establishing and pressure-regulating said gaseous column including inlet means for supplying gas under pressure to such total volume, outlet means for permitting the escape of gas from such total volume, and means for regulating the relative rates of such escape and supply of gas to selectively increase or decrease the pressure within such total volume and thereby included cylinder space so as to maintain said relatively reciprocable piston and cylinder structures in a predetermined positional relation substantially obviating the transmission of stop-and-rebound forces between said elements.

17. The combination of claim 16 in which one of said inlet and outlet means is provided by the structure defining said cylinder and the other by said piston structure, and in which said means for regulating the relative rates of such escape and supply of gas comprises sealing means carried by one of said structures for traversing the one of said inlet and outlet means provided by the other of said structures.

18. In combination with a pair of rotatable elements one of which is a driving element and the other a driven element said driving element being capable of displaying both short-interval angular vibratory displacements relative to said driven element and angular displacements relative thereto caused by longer-interval changes in the magnitude of the torque effecting rotational movement of the driving element, relatively reciprocable arcuate piston and arcuate cylinder structures respectively carried by said elements so as to rotate therewith and providing relatively arcuately reciprocable opposed surfaces, a pressurizable enclosure and means for establishing therewithin an arcuate gaseous column extending between said opposed surfaces and transmitting a torque between said elements, the volume of said enclosure being sufficiently larger than the increments and decrements to the volume of said column produced by such short-interval relative vibratory displacements so that substantially no change in pressure occurs within said enclosure because of such displacements, and means for automatically adjusting the value of the pressure within said enclosure in relation to such longer-interval relative displacements of said elements caused by changes in the magnitude of such applied torque so as to maintain said piston and cylinder structures in a predetermined positional relation substantially eliminating the transmission of stop-and-rebound forces between said driving and driven elements, said means for automatically adjusting such pressure value including inlet and outlet means for supplying gas under pressure to and for permitting escape thereof from said enclosure, and also including means for regulating the relative rates of such escape and supply of gas.

References Cited in the file of this patent

UNITED STATES PATENTS

| | | |
|---|---|---|
| 986,498 | Raders | Mar. 14, 1911 |
| 1,685,839 | Du Bois | Oct. 2, 1928 |
| 2,307,187 | Anderson | Jan. 5, 1943 |
| 2,812,648 | Croset | Nov. 12, 1957 |

FOREIGN PATENTS

| | | |
|---|---|---|
| 202,216 | Great Britain | Aug. 16, 1923 |
| 202,367 | Great Britain | Aug. 7, 1923 |